(12) United States Patent
Harslund et al.

(10) Patent No.: US 8,342,742 B2
(45) Date of Patent: Jan. 1, 2013

(54) THERMAL CALIBRATING SYSTEM

(75) Inventors: Jan Haakon Harslund, Slangerup (DK); Jørgen Reinholdt Larsen, Skævinge (DK); Folke Galsgaard, Nivå (DK)

(73) Assignee: Ametek Denmark A/S, Allerod (DK)

( * ) Notice: Subject to any disclaimer, the term of this patent is extended or adjusted under 35 U.S.C. 154(b) by 703 days.

(21) Appl. No.: 12/441,883

(22) PCT Filed: Sep. 18, 2007

(86) PCT No.: PCT/DK2007/000407
§ 371 (c)(1), (2), (4) Date: Oct. 16, 2009

(87) PCT Pub. No.: WO2008/034442
PCT Pub. Date: Mar. 27, 2008

(65) Prior Publication Data
US 2010/0101753 A1 Apr. 29, 2010

Related U.S. Application Data

(60) Provisional application No. 60/845,265, filed on Sep. 18, 2006.

(30) Foreign Application Priority Data

Sep. 18, 2006 (DK) .................................. 2006 01205

(51) Int. Cl.
*G01K 15/00* (2006.01)
*G01K 7/00* (2006.01)
*G01N 25/18* (2006.01)

(52) U.S. Cl. ................ 374/1; 374/44; 374/165

(58) Field of Classification Search ................ 374/1, 44, 374/165
See application file for complete search history.

(56) References Cited

U.S. PATENT DOCUMENTS
4,016,851 A * 4/1977 Rouam .......................... 123/676
(Continued)

FOREIGN PATENT DOCUMENTS
GB 1 480 109 7/1977
(Continued)

OTHER PUBLICATIONS

Yinghang et al.; "A Medium Temperature Radiation Calibration Facility Using a New Design of Heatpipe Blackbody As a Standard Source", Institute of Physics Publishing, Measurement Science and Technology, vol. 12, pp. 491-494, (2001).

*Primary Examiner* — Mirellys Jagan
(74) *Attorney, Agent, or Firm* — Finnegan Henderson Farabow Garrett & Dunner LLP

(57) ABSTRACT

The invention relates to a temperature calibrating system (1) comprising a thermo siphon, a heat pipe or an equivalent (2) connected between a cooling unit (4) and a temperature calibration unit (3), where the system (1) further comprises an external chamber (8) connected to the heat pipe/thermo siphon or equivalent (2) for controlling the thermal conductivity between the two units and where the temperature of the external chamber (8) is held at a certain temperature, for example ambient temperature or a temperature controlled by external means. The external chamber (8) can be connected to the heat pipe/thermo siphon (2) via a conduit (9) which connection point is placed above liquid level at a evaporating end of the heat pipe/thermo siphon (2) and in that the external chamber (8) is arranged below the connection between the conduit (9) and the heat pipe/thermo siphon (2).

12 Claims, 2 Drawing Sheets

U.S. PATENT DOCUMENTS

| | | | |
|---|---|---|---|
| 6,364,523 B1 * | 4/2002 | Vellut et al. | 374/45 |
| 6,390,668 B1 | 5/2002 | Materna | |
| 7,559,689 B2 * | 7/2009 | Harty | 374/165 |
| 2006/0064257 A1 * | 3/2006 | Pennington et al. | 702/50 |

FOREIGN PATENT DOCUMENTS

| | | |
|---|---|---|
| JP | 07-92037 | 4/1995 |

* cited by examiner

THERMAL CALIBRATING SYSTEM

CROSS REFERENCE TO RELATED APPLICATIONS

This application is a national phase application based on PCT/DK2007/000407, filed Sep. 18, 2007, and claims the priority of Danish Patent Application No. PA 2006 01205, filed Sep. 18, 2006, and the benefit of U.S. Provisional Application No. 60/845,265, filed Sep. 18, 2006, the content of all of which is incorporated herein by reference.

The invention relates to a temperature calibrating system comprising a thermo siphon, a heat pipe or an equivalent connected between a cooling unit and a temperature calibration unit.

BACKGROUND OF THE INVENTION

There are many ways of transferring heat from one point or area to another point or area. Two examples of one kind of technology used today for transferring energy with a low thermal resistance from one point or area to another point or area are a heat pipe and a thermo siphon.

A heat pipe is a two-phase heat transfer device with an extremely high effective thermal conductivity. It can be cylindrical or planar, and the inner surface is lined with a capillary wicking material. The heat pipe is evacuated and back-filled with a small quantity of a working fluid such as water, acetone or methanol. Heat is absorbed in the evaporator region by vaporizing the working fluid. The vapour transports heat to the condenser region where the vapour condenses, releasing heat to the cooling medium such as air. The condensed working fluid is returned to the evaporator by gravity or by capillary action if working against gravity.

Heat pipes have a lower total thermal resistance than solid conductors, enabling them to transfer heat more efficiently and evenly. They are totally passive heat transfer systems, having no moving parts to wear out and requiring no energy to operate.

A thermo siphon is like the heat pipe a two-phase heat transfer device with an extremely high effective thermal conductivity. But the inner surface is not lined with a capillary wicking material and the thermo siphon will therefore only work by gravity. This means, that the condenser region has to be situated higher than the evaporator region.

The operating temperature range of both heat pipes and thermo siphons depends on the working fluid. In general, the units will transfer energy in a temperature range limited by the freezing point of the working fluid at low temperatures and the critical point of the working fluid at high temperatures. The thermal conductivity of the unit varies over temperature (depending on the working fluid).

At temperatures above the critical point, the unit will not transfer energy, as the gas will not condensate. The pressure of the gas, which depends of the temperature of the unit, will continue to increase at temperatures above the critical point of the working fluid.

As mentioned, the working fluid can be water, acetone, methanol, carbon dioxide or propanol, but other fluids can also be used.

In the system the condensator end of the thermo siphon or heat pipe is cooled by an active cooling device (for example compressor system, thermoelectric module or a Stirling cooler) and the evaporating end of the thermo siphon or heat pipe is used to cool a media (example metal block of dry-block calibrator or liquid of a liquid bath).

SUMMARY OF THE INVENTION

The invention is achieved in that the system further comprises an external chamber connected to the heat pipe/thermo siphon or equivalent for controlling the thermal conductivity between the two units.

An external chamber is connected to the cooling unit (thermo siphon or heat pipe). When the temperature of the unit is higher than the temperature of the external chamber, the working fluid will condensate in the external chamber leaving only gas in the unit. The unit will therefore stop transferring energy and the pressure of the unit will be limited to the boiling pressure of the working fluid at the temperature of the external chamber.

The external chamber can be held at ambient temperature or the temperature of the external chamber can be controlled in order to control the temperature at which the unit stops transferring energy. The external chamber is connected at the top of the condenser placed on top of the cooling unit, but in another embodiment of the invention the external chamber could be connected to the thermo siphon as long as the connection point is situated above liquid level of the condensing gas at the evaporating end of the heat pipe/thermo siphon to avoid condensing gas flowing to the external chamber and unintentionally to act as thermo siphon.

The system with the external chamber will limit the temperature of the active cooling device to the temperature of the external chamber, even though the temperature of the evaporating end is exposed to higher temperatures.

The system with the external chamber can be used in an apparatus, where the external chamber controls the thermal conductivity between the two units.

The temperature of the volume could either be at ambient temperature or a temperature controlled by other means.

OBJECTS

A first aspect of this invention is to expand the temperature range of the temperature calibrator above the ratings of the cooling unit (e.g. a Stirling cooler).

Another aspect of the invention is to better control the heat flow to and from the calibration unit and to provide faster cooling of the calibration unit when desired.

Another aspect of the invention is to limit the gas pressure in the thermo siphon, when the temperature calibrator is working at high temperatures.

The invention also gives the benefit of a faster heating rate. At high temperatures, when the metal block is thermally disconnected from the cooling unit, only the metal block is heated up.

Similarly the cooling rate from above ambient temperature will be faster. Less energy has to be transferred, since the cooling unit is at ambient temperature and not at maximum temperature.

BRIEF DESCRIPTION OF THE DRAWINGS

The invention will be described more detailed in the following with reference to the figure, wherein.

DETAILED DESCRIPTION OF THE INVENTION

Figure 1:
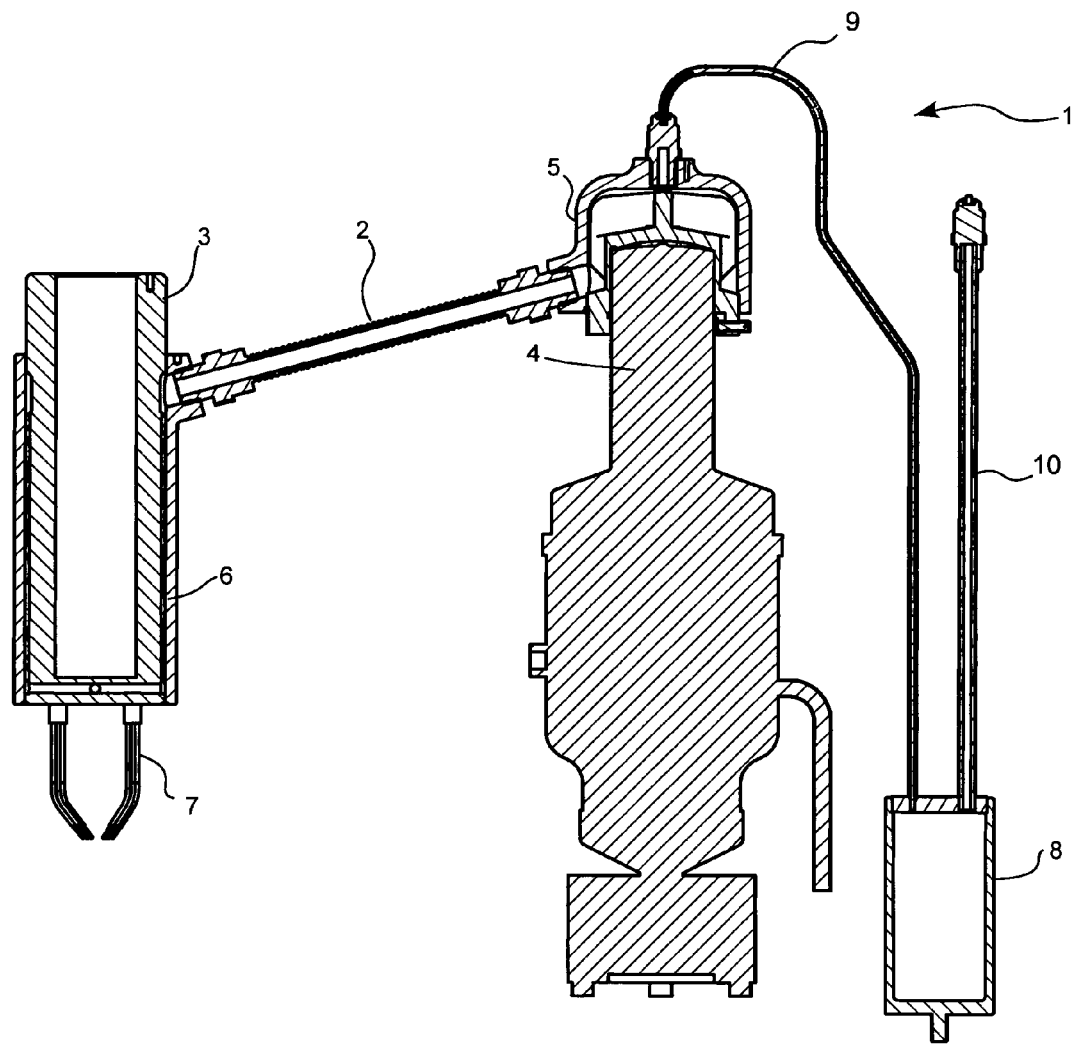
FIG. 1 shows a schematic cross-sectional view of a first embodiment of a thermal calibrating system.

In a first embodiment of a temperature calibrating system 1 according to the invention a thermo siphon 2, heat pipe or equivalent is used to transfer heat away from a temperature calibration unit 3 with the help of a cooling unit 4. FIG. 1 shows such a setup.

In the system shown in FIG. 1, a condensing end 5 of the thermo siphon 2 or heat pipe is cooled by an active cooling device (for example compressor system, thermoelectric module or a Stirling cooler 4) and an evaporating end 6 of the thermo siphon 2 or heat pipe is used to cool a media (example metal block of dry-block calibrator 3 or liquid of a liquid bath). In this way, heat is transferred from the media 3 to the cooling unit 4.

In temperature calibrating systems it is desired to be able to control the temperature of the temperature calibration unit 3 over a wide range of temperatures. It is therefore desired to be able to both cool and heat the temperature calibration unit 3. Therefore in the system shown in FIG. 1, temperature regulating elements 7 are embedded in the dry block calibrator unit 3. In the embodiment shown in FIG. 1, the temperature regulating elements 7 are simple electric heating elements or electrodes. In another embodiment the temperature regulating elements 7 could be one or more Peltier elements, which is able to provide heating as well as cooling to the temperature calibration unit 3.

However, when heating the temperature calibration unit 3, the heat pipe/thermo siphon 2 transfers heat from the temperature calibration unit 3 to the cooling unit 4. In many cases, excess heat will damage the cooling unit 4.

The primary object of this invention is therefore to expand the temperature range of the temperature calibrating system 1 above the ratings of the cooling unit 4 (e.g. a Stirling cooler).

Another object of the invention is to limit the gas pressure in the thermo siphon 2, when the temperature calibrating unit 3 is working at high temperatures.

These objectives are provided by connecting an external chamber 8 to the thermo siphon 2, heat pipe or equivalent. When the temperature of the heat pipe/thermo siphon 2 is higher than the temperature of the external chamber 8, the working fluid will condensate in the external chamber 8 leaving only gas in the heat pipe/thermo siphon 2. The heat pipe/thermo siphon 2 will therefore stop transferring energy and the pressure of the unit will be limited to the boiling pressure of the working fluid at the temperature of the external chamber 8.

In a certain embodiment, the external chamber 8 can be held at ambient temperature or the temperature of the external chamber 8 can be controlled via external means in order to control the temperature at which the unit stops transferring energy. For example if the temperature of the external chamber 8 is held at 50° C., then the heat pipe/thermo siphon 2 will stop conducting heat when the temperature of the heat pipe/thermo siphon 2 is about 50° C.

In this embodiment, the external chamber 8 is connected to the heat pipe/thermo siphon 2 via a conduit 9 which is connected to the condensing end 5.

In another embodiment, the external chamber 8 is connected to the heat pipe/thermo siphon 2 via a conduit 9 which is connected to the heat pipe/thermo siphon 2 where the connection point is situated above liquid level of the condensing gas at the evaporating end of the heat pipe/thermo siphon 2 to avoid condensing gas flowing to the external chamber 8 and unintentionally to act as thermo siphon.

Furthermore, the external chamber 8 is arranged below the point where the conduit 9 connects to the heat pipe/thermo siphon 2 or to the condensing end 5. In this way, condensed gas is prevented from flowing to the external chamber 8 and unintentionally acting as thermo siphon.

In further an embodiment of the temperature calibrating system 1 the conduit 9 can be connected to the evaporating part 6 of the temperature calibrating unit 3 and to prevent the conduit 9 and the external chamber 8 to act as a thermo siphon at least a part of the conduit 9 is situated above liquid level of the system 1.

The conduit 9 connecting the condensing end 5 with the external chamber 8 can be arranged to end at the top of the external chamber 8.

In another embodiment the conduit 9 extends down into the external chamber 8 forming a gap (not shown) between the conduit 9 and the bottom of the external chamber 8. Thereby it is possible to lead the working fluid back to the temperature calibrating unit 3 through the conduit 9 and the heat pipe/thermo siphon 2 in a fast and reliable manner.

The external chamber 8 is provided with a filler connection 10 for adding fluid to the system 1. It is possible within the scope of the invention to arrange such a filler connection 10 in another location of the system 1.

The system 1 with the external chamber 8 will limit the temperature of the active cooling device 4 to the temperature of the external chamber 8, even though the temperature of the evaporating end 6 is exposed to much higher temperatures.

In the case where the external chamber 8 is held at ambient temperature, the cold head temperature of the Stirling Cooler 4 is limited to ambient temperature even though the temperature of the evaporating end 6 could be at 125° C.

As an example, the evaporating end 6 of the heat pipe/thermo siphon 2 is connected to a metal block of a dry-block calibrator 3, which is heated to 125° C. by use of temperature regulating elements 7. The condensing end 5 is connected to a Stirling cooler 4 that has a maximum absolute operating temperature of the cold head of 50° C. and with the additional limitation, that the temperature should not exceed ambient temperature when the Stirling cooler 4 is operated. In this case, the external chamber 8 is held at ambient temperature limiting the temperature of the cold head temperature of the Stirling cooler 4 to ambient temperature even though the temperature of the evaporating end 6 is 125° C.

Another advantage of the invention is that it gives a faster heating rate. By thermally disconnecting the metal block from the cooling unit, only the metal block is heated up during the heating phase. This decreases the thermal inertia of the system.

Similarly the cooling rate from above ambient temperature will be faster. Less energy has to be transferred, since the cooling unit is at ambient temperature and not at maximum temperature.

In a second embodiment 20 of the invention, the system is used with a calibration unit 3 for higher temperatures (e.g. 700° C.). Due to the similarities between the first and second embodiments, the same reference numerals will be used to refer to the same elements of the two embodiments.

Figure 2:
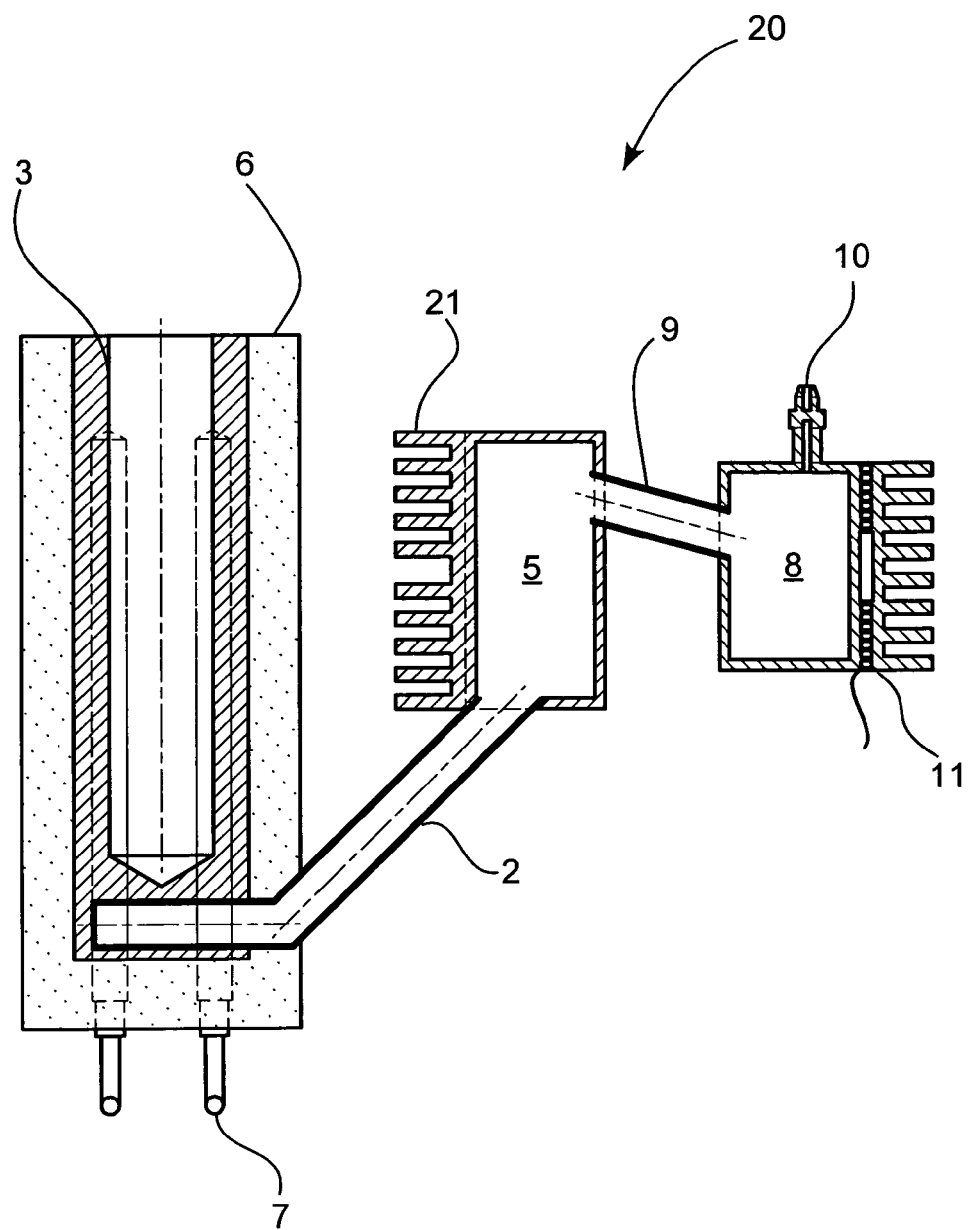
FIG. 2 shows a schematic cross-sectional view of a second embodiment of a thermal calibrating system.

In the system 20 shown in FIG. 2, a condensing end 5 of the thermo siphon 2 is connected to a cooling unit 21 e.g. a heat sink with a fan. In this calibration system it is desired to obtain a specific temperature e.g. 700° C. and keep the heat flow away from the calibration unit low while calibrating to obtain a precise temperature. During the calibration, the thermo siphon 2 is deactivated by keeping the temperature of the external chamber below the temperature in the condenser.

When the temperature of the calibration unit is to be lowered, it is desired to have a large heat flow away from the calibration unit 3 such that the time required for cooling is minimized. In this case, the thermo siphon is activated by heating the external chamber 8 such that its temperature is above the ambient temperature, e.g. to 150° C. The liquid in the external chamber 8 will therefore evaporate and will condense in the condenser 5, and the thermo siphon 2 will start transferring heat from the calibration unit 3 to the cooling unit 21. The temperature of the cooling unit will increase until it reaches the same temperature (150° C.) as the external chamber 8. The temperature of the calibration unit 3 will decrease rapidly due to the heat flow to the condenser 5.

When the calibration unit 3 reaches its desired temperature, the external chamber 8 is cooled down below the temperature of the condenser 5, and the liquid will condense in the external chamber, and the thermo siphon 2 will stop transferring heat from the calibration unit 3. As long as the external chamber 8 is kept at a lower temperature than the condenser 5, the thermo siphon will not transfer heat away from the calibration unit 3.

The embodiment of FIG. 2 has a number of advantages when compared to the prior art. A first example is that there will be a low heat flow away from the calibration unit during the time when the calibration is performed. This will ensure a homogeneous temperature distribution in the calibration unit. Another advantage is that when the thermo siphon is activated, there will be a high heat flow away from the calibration unit. Furthermore, the temperature of the cooling unit is controlled to a temperature that gives a high efficiency and is compatible with the choice of materials. In addition, the pressure is controlled and limited by the temperature of the coolest point in the system.

The invention claimed is:

1. A temperature calibrating system comprising a thermo siphon or a heat pipe connected between a cooling unit and a temperature calibration unit, and an external chamber connected to the thermo siphon or heat pipe for controlling the thermal conductivity between the two units.

2. The temperature calibrating system according to claim 1, including temperature regulating elements for the temperature calibration unit comprising electric heating elements.

3. The temperature calibrating system according to claim 1, including temperature regulating elements for the temperature calibration unit comprising one or more Peltier elements.

4. The temperature calibrating system according to claim 1, wherein the external chamber provided with a filler connection for adding fluid to the system.

5. The temperature calibrating system according to claim 1, wherein the temperature of the external chamber is held at a certain temperature.

6. The temperature calibrating system according to claim 5, wherein the temperature is ambient temperature or a temperature controlled by external means.

7. The temperature calibrating system according to claim 1 or 5, wherein the external chamber is connected to the themo siphon or heat pipe via a conduit which connection point is placed above a liquid level at an evaporating end of the thermo siphon or heat pipe and the external chamber is arranged below the connection between the conduit and the thermo siphon or heat pipe.

8. The temperature calibrating system according to claim 7, wherein the conduit ends at a top of the external chamber.

9. The temperature calibrating system according to claim 7, wherein the conduit extends down into the external chamber forming a gap between the conduit and a bottom of the external chamber.

10. The temperature calibrating system according to claim 7, wherein at least a part of the conduit is situated above a liquid level of the system.

11. The temperature calibrating system according to claim 1 or 5, wherein the external chamber is connected to the themo siphon or heat pipe via a conduit which is connected to the themo siphon or heat pipe around a top end thereof or to a condensing end and external chamber is arranged below the connection between the conduit and the themo siphon or heat pipe.

12. The temperature calibrating system according to claim 11, wherein the external chamber is connected via a conduit which is connected to the top end of the condensing end.

\* \* \* \* \*

EX PARTE REEXAMINATION CERTIFICATE (42nd)
Ex Parte Reexamination Ordered under 35 U.S.C. 257

United States Patent
Harslund et al.

(10) Number: US 8,342,742 C1
(45) Certificate Issued: Nov. 16, 2015

(54) THERMAL CALIBRATING SYSTEM

(75) Inventors: Jan Haakon Harslund, Slangerup (DK); Jørgen Reinholdt Larsen, Skævinge (DK); Folke Galsgaard, Nivå (DK)

(73) Assignee: AMETEK DENMARK A/S

Supplemental Examination Request:
No. 96/000,103, Apr. 17, 2015

Reexamination Certificate for:
Patent No.: 8,342,742
Issued: Jan. 1, 2013
Appl. No.: 12/441,883
PCT Filed: Sep. 18, 2007
PCT No.: PCT/DK2007/000407
§ 371 (c)(1),
(2), (4) Date: Oct. 16, 2009
PCT Pub. No.: WO2008/034442
PCT Pub. Date: Mar. 27, 2008

Related U.S. Application Data

(60) Provisional application No. 60/845,265, filed on Sep. 18, 2006.

(30) Foreign Application Priority Data

Sep. 18, 2006 (DK) .................................. 2006 01205

(51) Int. Cl.
*G01K 15/00* (2006.01)
*G01K 7/00* (2006.01)
*G01N 25/18* (2006.01)
*F25D 19/00* (2006.01)
*F28D 15/02* (2006.01)
*F28F 13/00* (2006.01)
*F28D 15/00* (2006.01)
*F28D 15/06* (2006.01)

(52) U.S. Cl.
CPC .............. *F25D 19/006* (2013.01); *F28D 15/00* (2013.01); *F28D 15/0266* (2013.01); *F28D 15/06* (2013.01); *F28F 13/00* (2013.01); *G01K 15/002* (2013.01); *F28F 2013/006* (2013.01)

(58) Field of Classification Search
None
See application file for complete search history.

(56) References Cited

To view the complete listing of prior art documents cited during the supplemental examination proceeding and the resulting reexamination proceeding for Control Number 96/000,103, please refer to the USPTO's public Patent Application Information Retrieval (PAIR) system under the Display References tab.

*Primary Examiner* — William Doerrler

(57) ABSTRACT

The invention relates to a temperature calibrating system (1) comprising a thermo siphon, a heat pipe or an equivalent (2) connected between a cooling unit (4) and a temperature calibration unit (3), where the system (1) further comprises an external chamber (8) connected to the heat pipe/thermo siphon or equivalent (2) for controlling the thermal conductivity between the two units and where the temperature of the external chamber (8) is held at a certain temperature, for example ambient temperature or a temperature controlled by external means. The external chamber (8) can be connected to the heat pipe/thermo siphon (2) via a conduit (9) which connection point is placed above liquid level at a evaporating end of the heat pipe/thermo siphon (2) and in that the external chamber (8) is arranged below the connection between the conduit (9) and the heat pipe/thermo siphon (2).

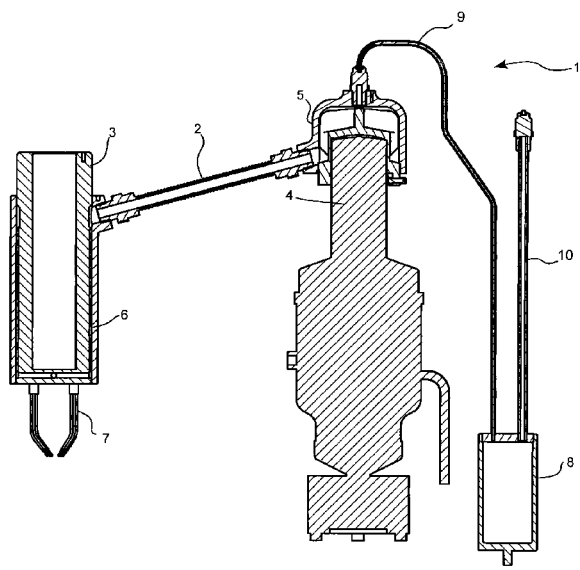

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-12 is confirmed.

New claims 13-20 are added and determined to be patentable.

*13. The temperature calibrating system of claim 1, wherein the cooling unit is a Stirling cooler.*

*14. The temperature calibrating system of claim 13, wherein the thermo-siphon or heat pipe includes a condensing end connected to a cold head of the Stirling cooler.*

*15. The temperature calibrating system of claim 14, wherein the condensing end of the thermo-siphon or heat pipe is in the form of a cap.*

*16. The temperature calibrating system of claim 15, wherein the external chamber is connected to the thermo siphon or heat pipe via a conduit which connection point is located at a top location of the cap.*

*17. The temperature calibrating of claim 16, wherein the connection point is located at a topmost point of the cap.*

*18. The temperature calibrating system of claim 1, wherein the temperature calibration unit comprises a metal block positioned coaxially within an evaporation end of the thermo siphon or heat pipe.*

*19. The temperature calibrating system of claim 18, wherein the thermo-siphon or heat pipe contains a working fluid and the evaporation end is configured such that the working fluid occupies an annular space around the metal block.*

*20. The temperature calibrating system of claim 1, wherein the temperature calibration unit comprises a metal block, the thermo-siphon or heat pipe includes an evaporation end containing a working fluid, and the evaporation end is configured such that the working fluid occupies an annular space around the metal block.*

* * * * *